(12) United States Patent
Smith, Jr. et al.

(10) Patent No.: US 8,876,146 B2
(45) Date of Patent: Nov. 4, 2014

(54) CHILD CARRIER SYSTEM

(71) Applicants: Jerry Smith, Jr., Ypsilanti, MI (US); Nathaniel Whitsett, Romulus, MI (US); Terrence T. Thompson, Canton, MI (US)

(72) Inventors: Jerry Smith, Jr., Ypsilanti, MI (US); Nathaniel Whitsett, Romulus, MI (US); Terrence T. Thompson, Canton, MI (US)

( * ) Notice: Subject to any disclaimer, the term of this patent is extended or adjusted under 35 U.S.C. 154(b) by 0 days.

(21) Appl. No.: 13/830,025

(22) Filed: Mar. 14, 2013

(65) Prior Publication Data

US 2014/0265259 A1   Sep. 18, 2014

(51) Int. Cl.
*B62B 7/10* (2006.01)
*B62B 9/12* (2006.01)

(52) U.S. Cl.
CPC ........................................ *B62B 9/12* (2013.01)
USPC .......................................... 280/642; 280/647

(58) Field of Classification Search
CPC ............ B62B 7/00; B62B 7/06; B62B 7/068; B62B 7/08; B62B 7/086; B62B 7/10; B62B 7/12; B62B 9/00; B62B 9/10; B62B 9/12
USPC ........... 280/639, 37, 642, 643, 644, 647, 648, 280/650, 657, 658, 47.38
See application file for complete search history.

(56) References Cited

U.S. PATENT DOCUMENTS

| | | | |
|---|---|---|---|
| 2,346,989 A | 4/1944 | O'Brien | |
| 3,984,115 A | 10/1976 | Miller | |
| 4,157,837 A | 6/1979 | Kao | |
| 4,487,428 A | 12/1984 | Harada et al. | |
| 4,620,711 A | 11/1986 | Dick | |
| 4,747,526 A | 5/1988 | Launes | |
| 4,762,256 A | 8/1988 | Whitaker | |
| 4,915,401 A | 4/1990 | Severson et al. | |
| 4,946,180 A * | 8/1990 | Baer | 280/39 |
| 7,354,049 B2 | 4/2008 | Schmidt | |
| 7,584,985 B2 * | 9/2009 | You et al. | 280/643 |
| 7,871,099 B2 * | 1/2011 | Gilbertson et al. | 280/642 |
| 2005/0258619 A1 | 11/2005 | Zweideck | |
| 2006/0066076 A1 | 3/2006 | Church | |
| 2008/0042379 A1 | 2/2008 | Amran | |
| 2012/0306181 A1* | 12/2012 | Clifton | 280/647 |

FOREIGN PATENT DOCUMENTS

| | | |
|---|---|---|
| KR | 20100029641 A | 3/2010 |
| WO | 2005113317 A1 | 12/2005 |

* cited by examiner

*Primary Examiner* — John Walters
(74) *Attorney, Agent, or Firm* — Brooks Kushman P.C.

(57) ABSTRACT

A convertible child carrier is provided comprising a pair of opposing central hub members having telescopic rear legs pivotally attached the hub members at a first end. Each of the legs has a pivotable wheel affixed to a second end. The child carrier further includes a yoke member generally defining an arch-like shape that is also pivotally attached to both of the pair of hub members. An additional wheel is affixed a central section of the yoke member. The child carrier further includes a handle member pivotally attached to each of the hub members, a seating portion disposed between the distal ends of the yoke member, and a storage portion affixed to the handle member defining an internal storage cavity. The rear legs, the yoke member, and the handle member each may pivot to a stowed configuration such that the storage portion encompasses the members within the storage cavity.

18 Claims, 6 Drawing Sheets

CHILD CARRIER SYSTEM

TECHNICAL FIELD

This disclosure relates to a deployable child carrier.

BACKGROUND

Child strollers have several common configurations. Some are collapsible, but they are often bulky and cumbersome to change between collapsed and deployed states. Also, the collapsed state often has significant size and may present difficulties in transport. Further, once the stroller is collapsed any storage areas which may have previously been available when deployed become unusable.

SUMMARY

In at least one embodiment, a convertible child carrier is provided comprising a pair of opposing central hub members having telescopic rear legs pivotally attached the hub members at a first end. Each of the legs has a wheel affixed to a second end that is pivotable about a longitudinal axis of each of the rear legs. The child carrier further includes a yoke member generally defining an arch-like shape that is pivotally attached to both of the pair of hub members at distal ends of the arch-like shape. The yoke member also has a wheel affixed to a central section of the arch-like shape. The child carrier further includes a handle member pivotally attached to each of the hub members, a seating portion disposed between the distal ends of the yoke member, and a storage portion affixed to the handle member defining an internal storage cavity. Each of the rear legs, the yoke member, and the handle member are pivotable to a stowed configuration such that the storage portion is capable of encompassing the members within the storage cavity.

In at least one embodiment, a mobile storage unit having a deployable child carrier is provided. The mobile storage unit comprises a storage portion having a plurality of internal compartments, and a stroller mechanism capable of collapsing within a first compartment of the storage portion. The stroller mechanism further comprises a pair of central hub members having a plurality of pivotable attachments, a pivotable yoke member attached to the central hubs, where the yoke also has a wheel attached to an end opposite from the central hubs. The stroller mechanism also includes a pair of pivotable rear legs attached to the central hubs, each having a wheel attached to an end opposite from the central hubs. The stroller further has a handle member pivotably attached to the central hubs and protruding through the storage portion. The mobile storage unit further includes at least one carry strap attached to the storage portion enabling user transport of the storage unit. A second compartment of the storage portion is capable of stowing user objects when the stroller mechanism is collapsed within the first compartment.

In at least one embodiment, a deployable child carrier is provided comprising a handle member, a telescoping yoke member having at least one wheel attached thereto, a telescoping rear member having at least one wheel attached thereto, and a pair of opposing central hub members, wherein each of the handle member, the yoke member, and the rear member are pivotally attached to both opposing hub members. The child carrier further includes a seating portion disposed about the yoke member, a release mechanism actuated at the handle member operable to selectively allow rotation of the handle member, the yoke member, and the rear member to a substantially parallel alignment, and a storage portion defining an internal compartment capable of housing the handle member, the yoke member, and the rear member when substantially aligned in a stowed configuration.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
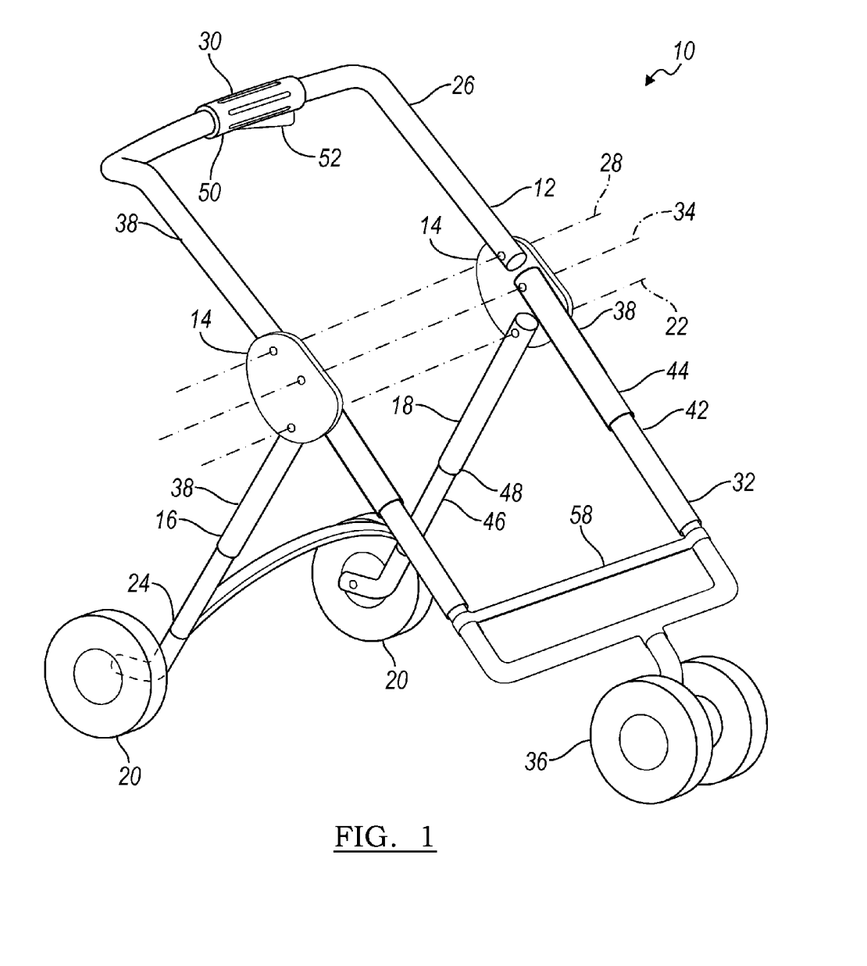
FIG. 1 is a perspective view of a frame assembly of a child carrier in a deployed configuration.
Figure 2:
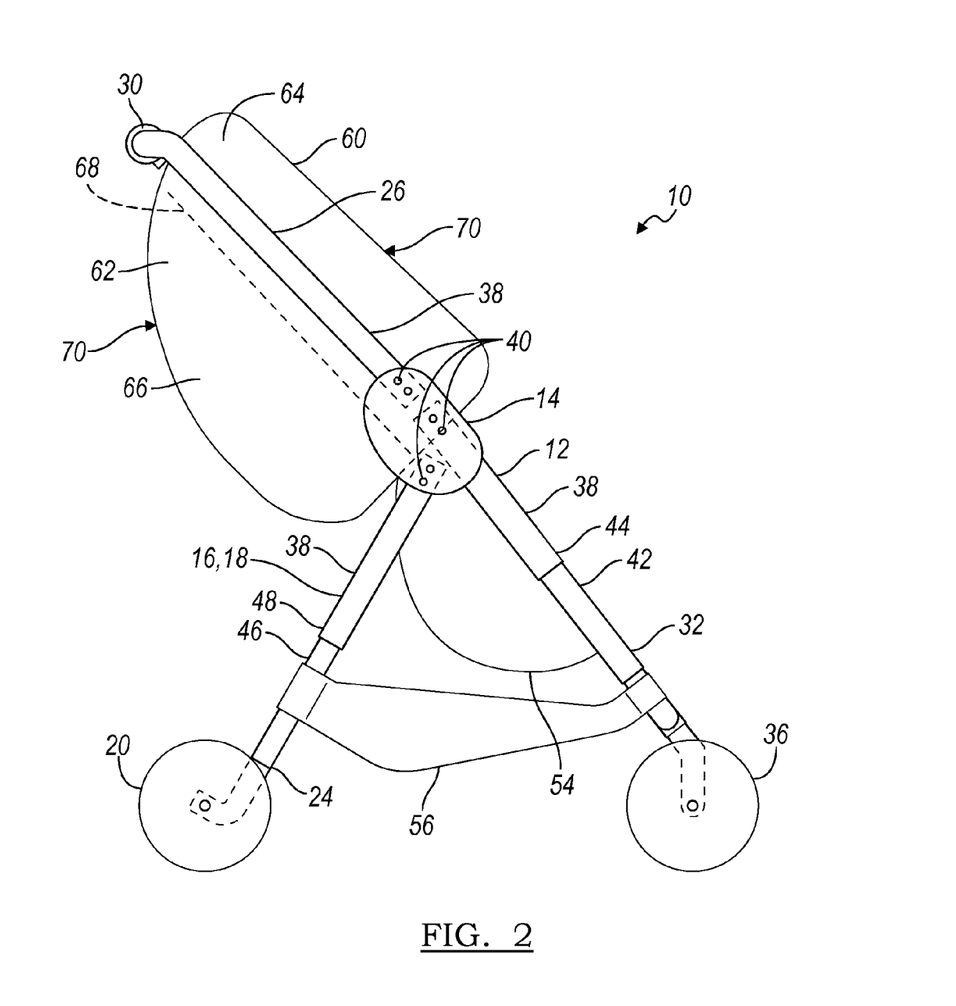
FIG. 2 is a side view of a child carrier.

FIGS. 1 and 2 depict a convertible child carrier 10 in a deployed configuration according to an embodiment. A frame assembly 12 provides structural support for the carrier 10. The frame assembly 12 includes a pair of opposing central hub members 14 in a middle region of both sides of the device. Extending from the each of the pair of hub members 14 are right and left rear legs 16, 18, respectively. Each of the rear legs 16,18 is attached to a central hub member 14 at a first end, and has a hinged wheel 20 affixed to a second distal end. Both of the rear legs 16, 18 are pivotable about a first axis 22, and are telescopic along the length of each leg. The rear legs 16, 18 are shown in an extended state while the frame assembly 12 is in the deployed configuration of FIGS. 1 and 2.

A hinge portion 24 of each rear leg 16, 18 positions the hinged wheels 20 in a fore-aft alignment when the rear legs 16, 18 are in the extended state. Each of the hinge portions 24 is mechanically linked to the rear legs 16, 18 such that the wheels 20 pivot about a longitudinal axis from the fore-aft alignment to a transverse alignment when the rear legs 16, 18 are collapsed from their extended state.

FIGS. 1 and 2 further depict an upper handle member 26 generally having an arch-like shape, spanning across the pair of central hub members 14. An arch-like shape is one that has three segments. A first section extends in a direction, a second section extends laterally, and a third return section. The handle member 26 further defines two extensions, where each is pivotally attached to one of the opposing central hub members 14. The handle member 26 is thereby capable of rotation about a second axis 28. A hand grip portion 30 is disposed near a central portion of the handle member 26 such that a user can easily control and direct movement of the carrier 10.

Still referring to FIGS. 1 and 2, the frame assembly 12 also includes a forward yoke member 32. The yoke member 32 is also generally arch-shaped having two extensions, where a distal ends of the extensions are pivotally attached to a central hub members 14. The yoke member 32 is thereby configured to rotate about a third axis 34. The arch shape of the yoke member 32 further defines a central portion spanning across the frame assembly 12, connecting each extension. The central portion has a swivel wheel 36 extending laterally therefrom. The swivel wheel 36 is freely rotatable to respond to user steering inputs via the handle 26 as described above. Each of the two extensions is also telescopic and shown in an extended state in the deployed configuration of FIGS. 1 and 2.

The rear legs 16, 18, the yoke member 32, and the handle member 26, collectively referred to as rotatable members 38, are restricted from rotating in the deployed state by a first locking feature. In at least one embodiment, the first locking feature comprises retractable pins 40 protruding laterally from each of the rotatable members 38. The retractable pins 40 associated with each rotatable member 38 may be offset from the respective axes of rotation 22, 28, 34 of each member. When the pins 40 are protruded, they engage the central hub members 14, preventing rotation of the respective rotatable member 38. Upon activation of the first locking feature, the pins 40 retract and release from the central hub members 14 thereby allowing a pivot motion of the members 38 about their respective axes of rotation 22, 28, 34.

Although retractable pins 40 are disclosed, it is contemplated that additional means for restricting rotation of the members 38 are available. For example, alternative embodiments may provide retractable pins that protrude from each of the hub members 14 engaging the rotatable members 38 so as to restrict movement. In such embodiments, activation of the first locking feature similarly retracts the pins allowing rotation of the rotatable members 38.

In additional alternative embodiments, each of the rotatable members 38 may be configured to nest within a complimentary shape disposed on the hub members 14. Such a nesting is capable of restricting rotation of the rotatable members 38. Upon separation of a particular rotatable member 38 from the complimentary shape, rotation is allowed. When the rotatable member is seated within the shape, rotation is restricted. In further alternative embodiments, a ratcheting mechanism disposed near the axes of rotation 22, 28, 34 may also be suitable to restrict rotation of the members in a given direction.

The yoke member 32 and rear legs 16, 18 are further held in the extended state by a second locking feature while the carrier 10 is in the deployed state. The second locking feature selectively allows a telescoping motion to extend or collapse the extensions of the yoke member 32, as well as the rear legs 16, 18. These rotatable members are capable of collapsing from the extended state shown in FIGS. 1 and 2. The extensions of the yoke member 32 comprise a first segment 42 and a second segment 44. The first segment 42 is sized to be received within the second segment 44 through a telescoping action. Similarly, the rear legs 16, 18 also comprise two segments 46, 48 configured to collapse from the extended state. A first segment 46 of the rear legs is sized to be received within a second segment 48 through a telescoping action. Actuation of the second locking feature allows the members to convert from the extended state to a collapsed state.

The handle member 26 further has a release mechanism 50, linking the grip portion 30 to at least one of the hub members 14. Both of the first and second locking features may be actuated by the release mechanism 50. The release mechanism 50 is further configured to release the first and second locking features at substantially the same time to enable the frame assembly 12 to convert from the deployed configuration to a stowed configuration. Related to linkages between the various portions of the mechanics, there may be some temporal lag in the release of the various rotatable members 38, as well as the first and second mechanisms. An actuator 52 for the release mechanism 50 is disposed on the grip portion 30 such that a user can selectively actuate the mechanism in convenient fashion. The actuator 52 is shown as a button, but it is contemplated that other actuator styles may be suitable to activate the release mechanism 50, such as a twist collar, a slide collar, various levers, etc.

Although FIG. 1 shows only the frame assembly 12, several additional features are included in the child carrier 10. FIG. 2 depicts a flexible child seating portion 54 disposed between the extensions of the yoke member 32. There is additionally a collapsible lower storage feature 56 beneath the child seating portion 54. In at least one embodiment, the lower storage feature 56 comprises a flexible basket spanning across each of the right and left rear legs 16, 18, and the yoke member 32.

In further embodiments, an adjustable foot rest 58 is configured to span across the extensions of the yoke member 32. The foot rest 58 may be configured to fit over the extensions in a number of selectable positions to accommodate differing leg lengths of a range of children.

The child carrier 10 further comprises a storage portion 60. In at least one embodiment, the storage portion 60 is disposed about the handle member 26. Further, the grip portion 30 may extend through, and protrude outside of the storage portion 60. The storage portion 60 also defines an internal storage cavity 62 having a plurality of internal compartments. A first compartment 64 serves as a location to house the frame assembly 12 in the stowed configuration. The storage portion 60 also has a second compartment 66 configured to receive various user articles. The second compartment 66 is available for user storage both when the frame assembly 12 is in the deployed configuration as well as the stowed configuration. In this way the device operates as a mobile storage unit in cooperation with a deployable stroller mechanism. The first and second compartments 64, 66 are divided by an internal dividing wall 68 to isolate the mechanics of the frame assembly 12 from user items stored within the second compartment 66. The dividing wall 68 may be rigid so as to provide further structure, and assist in supporting the overall shape of the storage portion 60. Each of the first and second compartments 64, 66 of the storage portion 60 includes an access panel 70, releasable by a zipper, Velcro, flaps, pull strings, or other similar retention means.

Figures 3, 4:
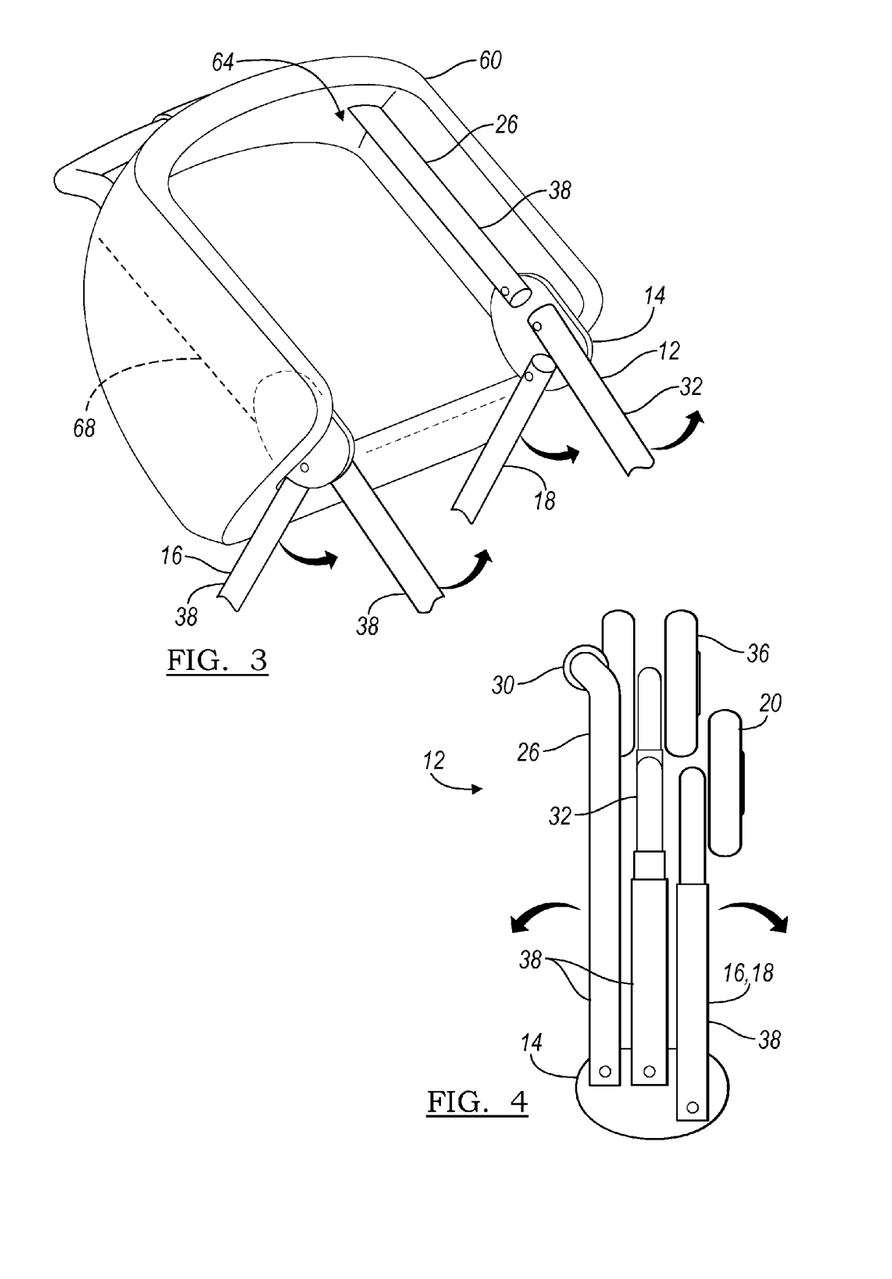
FIG. 3 is a perspective view of a storage portion of a child carrier.
FIG. 4 is a side view of a frame assembly in a stowed configuration.

FIG. 3 depicts the access panel 70 of the first compartment 64 removed to expose the cavity therein. A user may release the access panel 70 of the first compartment 64, and stow the frame assembly 12 by actuation of the rotatable members 38 into the first compartment 64, as indicated by arrows in the figure. The user may then reattach the access panel 70 to secure the frame assembly 12 in the stowed configuration. Similarly, the second compartment 66 has at least one releasable access panel 70 allowing users to deposit and secure user objects within the second compartment 66.

Figure 5:
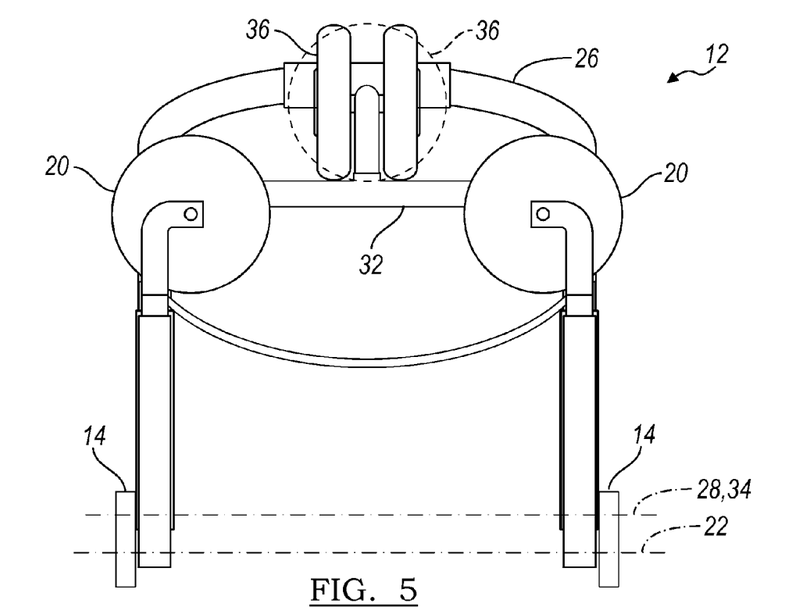
FIG. 5 is a front view of the frame assembly of FIG. 4 in a stowed configuration.
Figure 6:
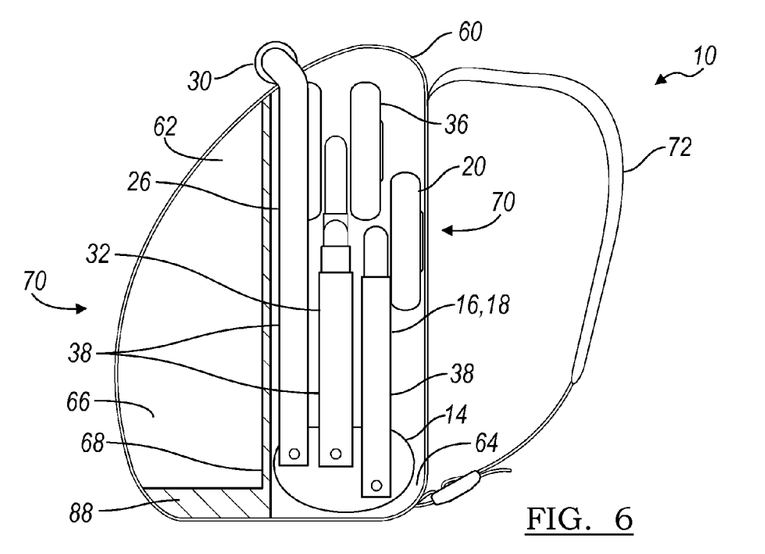
FIG. 6 is a side view of the child carrier in the stowed configuration.

FIGS. 4, 5, and 6 depict the frame assembly 12 in the stowed configuration. The frame assembly 12 is converted to a compact state such that the assembly can be enclosed within the storage portion 60. In this way, the entire device may be conveniently transported in a compact state. The child carrier 10 further includes external carry straps 72 to enable a user to easily transport the carrier 10. Although backpack-style shoulder straps are depicted in FIG. 6, it is contemplated that different types of straps are available. For example, a sternum or waist cross strap may additionally be employed to span across the backpack straps 72 to distribute the weight of the carrier. Additionally, other styles of carry handles or straps may be useful in transporting the carrier 10 when the frame assembly 12 is in the stowed configuration. The straps 72 may further be stowed within the storage portion 60 when the frame assembly 12 is in the deployed configuration.

When converting the frame assembly 12 from the deployed configuration to the stowed configuration, each of the rotatable members 38 is rotated about their respective axes such that they are in a substantially parallel alignment in relation to each other. The rotation is enabled by the release of the first locking feature as described above. Also, the yoke member 32 extensions, as well as both rear legs 16, 18 are collapsed from their extended states, which is enabled by the release of the second locking feature. Also discussed above, the collapsing action of the rear legs 16, 18 causes each of the rear wheels 20 to rotate about a longitudinal axis from a fore-aft alignment to a transverse alignment. The swivel wheel 36 of the yoke member 32 is freely rotated, also to a transverse alignment. As can be seen from FIGS. 4 and 5, all wheels of the frame assembly 12 are aligned to be generally in the same planar relation to the rotatable members 38.

Related to the convenience of transporting the carrier in the stowed state, it is contemplated that the frame assembly 12 is constructed of a lightweight structural material. In at least one embodiment, the frame members are comprised of extruded aluminum. Alternatively, steel alloys, composite materials, as well as various plastics may serve to provide a stiff, lightweight structure.

Although basic tubular members are depicted for simplicity, it is contemplated that more complex cross sections of each of the rotatable members may provide additional advantages. In at least one embodiment, the cross sections of each of the rotatable members are configured to nest against one another in the stowed configuration. By the components contacting each other with cooperative shapes, gaps therebetween may be eliminated. In this way, a more efficient compact package may be achieved.

In at least one embodiment, the second compartment 66 is further subdivided into a plurality of articulable chambers. The access panel 70 of the second compartment 66 may be configured to unfurl and present the chambers to a user for ease of access. The chambers thereby can collectively operate as an organizer for a large number of user items to be transported within the child carrier 10. The chambers may further be suitable to receive user objects particularly related to children. For example, at least one chamber may be thermally insulated to function as liquid cooling chamber for bottles or beverages. Also, smaller pockets for personal items may be included such that a user would have no need to carry an additional bag or purse for their own personal items such as a mobile phone, wallet, keys, etc.

Figure 7:
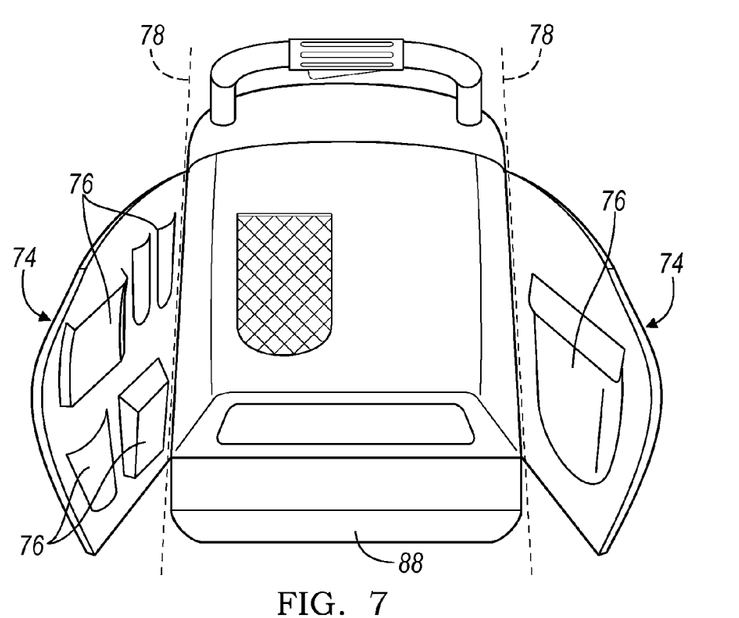
FIG. 7 is a front perspective view of an embodiment of a child carrier having articulable chambers.
Figure 8:
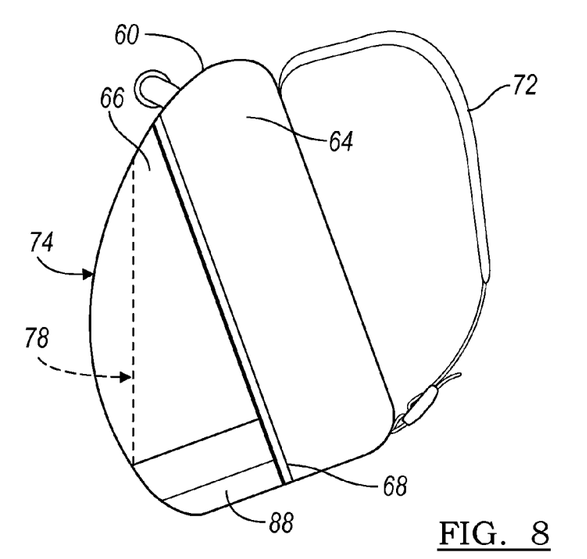
FIG. 8 is a cut away side view of the child carrier of FIG. 7.

FIGS. 7 and 8 depict an embodiment of articulable chambers. Two opposing access panels 74 are employed in this embodiment. On an internal portion of each of the panels 74, several configurations of articulable chambers 76 are envisioned. Each of the plurality of chambers may have an array of different shapes to stably house particular user items. Each panel 74 is configured to release in opposing directions to expose the plurality internal articulable chambers 76 within the second compartment 66. Each panel 74 is pivotable generally about a vertical axis 78. Once both panels 74 are released exposing the internal cavity, internal surfaces may be suitable to serve as a rest area for user objects.

Figure 9:
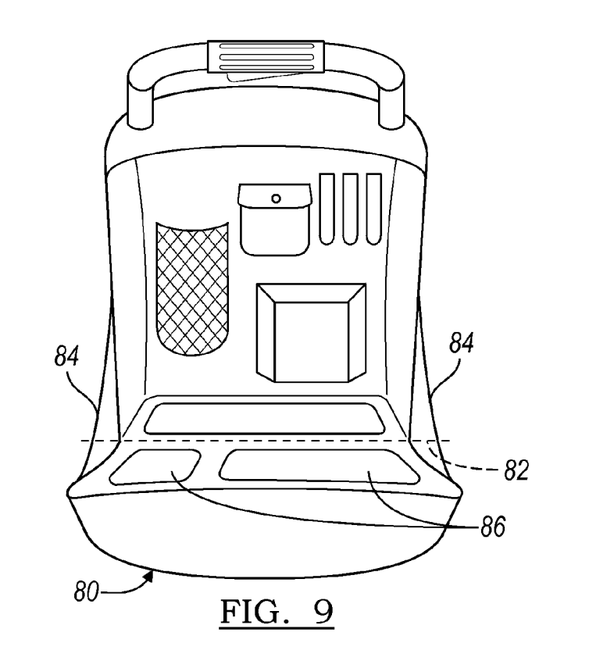
FIG. 9 is a front perspective view of another embodiment of a child carrier having articulable chambers.
Figure 10:
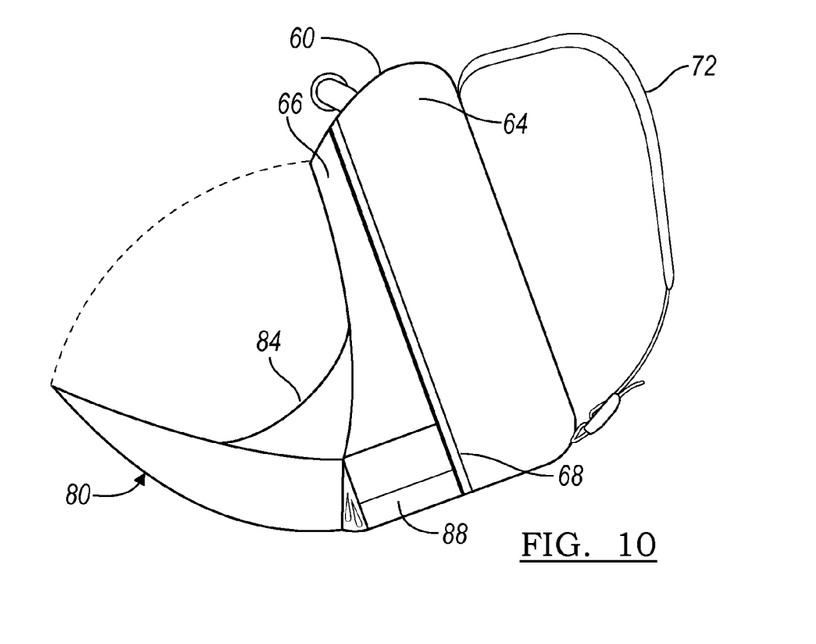
FIG. 10 is a cut away side view of the child carrier of FIG. 9.

FIGS. 9 and 10 depict another embodiment of articulable chambers. A single access panel 80 is capable from releasing from the storage portion 60 to reveal the internal cavity to a user. The access panel 80 also has articulable chambers 86 disposed on an inner surface. The access panel 80 is capable of hinging about a horizontal axis 82 from a first closed position to a second position. A stop limit 84 may further be included to define the second position. In one embodiment the stop limit is comprised of a fabric web. Similar to the previous embodiment, once the access panel 80 is released, a rest surface is available on an inner surface of the access panel 80 to rest user objects.

In at least one embodiment, a cover is deployably housed within a lower compartment 88 of the storage portion 60. The cover is operable to extend to substantially shroud the storage portion 60. The cover may be constructed from a sheet layer that is generally water resistant. When the cover is deployed it serves as an additional water barrier to restrict water from entering the storage portion 60. In at least one embodiment, a portion of the sheet cover remains attached to the lower portion 88, and extends upwardly to retain to an upper portion of the storage portion 60. It is contemplated that a number of various retention means may be suitable for such a purpose. Velcro, snaps, buttons, stretchable materials are each examples of potential retention means to hold the cover in place.

In alternative embodiments, the rear legs are combined to a single rear member pivotally attached to, and spanning across the pair of opposing central hubs. The single rear member further has two hinged wheels attached to an end opposite to the central hubs. Similar to previous embodiments, the hinged wheels pivot from a fore-aft alignment to a transverse alignment when the rear member rotates to the stowed configuration.

In further alternative embodiments, the handle member may additionally capable of a telescoping action. This allows for an adjustable height of the handle position in order to accommodate users of varying heights. The telescoping handle member may further provide additional user transport options when the carrier is in the stowed configuration. For example, an extended handle may give users more flexibility in how the carrier is moved.

Although a backpack is depicted in the above embodiments, it is contemplated that alternate bag styles may be suitable to accomplish a deployable child carrier having articulable storage. For example, an outer hard case container comprising the storage portion may be particularly useful in travel situations involving luggage handling. The compact configurations allow a child carrier to be conveniently taken with the user as typical luggage. Additionally, a duffel style bag, or a satchel style bag may also be suitable for application in the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A convertible child carrier comprising:
   a pair of opposing central hub members;
   telescopic rear legs, each leg pivotally attached to one of the pair of hub members at a first end, and each leg having a wheel affixed to a second end that is pivotable about a longitudinal axis of each of the rear legs;
a yoke member generally defining an arch-like shape pivotally attached to both of the pair of hub members at distal ends of the arch-like shape, and having a wheel affixed to a central section of the arch-like shape;
a handle member pivotally attached to each of the hub members;
a seating portion disposed between the distal ends of the yoke member; and
a storage portion affixed to the handle member defining an internal storage cavity,
wherein each of the rear legs, the yoke member, and the handle member are pivotable to a stowed configuration such that the storage portion is capable of encompassing each of the rear legs, the yoke member, and the handle member within the storage cavity, and wherein the wheel affixed to each rear leg is adapted to pivot about the longitudinal axis from a fore-aft alignment in a deployed configuration to a transverse alignment in the stowed configuration.

2. The child carrier of claim 1 further comprising a release mechanism disposed on at least one of the pair of hub members configured to selectively allow pivoting of each of the rear legs, yoke member, and handle member.

3. The child carrier of claim 1 wherein each of the rear legs, the yoke member, and the handle member are pivotable to a substantially parallel alignment in the stowed configuration.

4. The child carrier of claim 1 wherein the storage portion further comprises a dividing wall within the storage cavity thereby defining a first compartment to encompass each of the rear legs, the yoke member, and the handle member in the stowed configuration, and a second compartment for receiving user articles.

5. The child carrier of claim 4 further comprising at least one access panel to releasably enclose each of the first and second compartments.

6. The child carrier of claim 5 wherein the at least one access panel comprises two access panels where each are capable of releasing in opposing directions to expose a plurality of articulable chambers within the second compartment.

7. The child carrier of claim 1 further comprising a cover deployably housed within a compartment of the storage portion and operable to substantially cover the child carrier in the stowed configuration.

8. A mobile storage unit having a deployable child carrier comprising:
a storage portion having a plurality of internal compartments;
a stroller mechanism capable of collapsing from a deployed configuration to a stowed configuration within a first compartment of the storage portion, the stroller mechanism comprising:
a pair of central hub members having a plurality of pivotable attachments;
a pivotable yoke member attached to the central hubs, having a wheel attached to an end opposite from the central hubs;
a pair of pivotable rear legs attached to the central hubs, each having a wheel attached to an end opposite from the central hubs; and
a handle member pivotably attached to the central hubs and protruding through the storage portion; and
at least one carry strap attached to the storage portion enabling user transport of the storage unit,
wherein a second compartment of the storage portion is capable of stowing user objects when the stroller mechanism is collapsed within the first compartment, and wherein the wheel attached to each rear leg is adapted to pivot about the longitudinal axis from a fore-aft alignment in the deployed configuration to a transverse alignment in the stowed configuration.

9. The mobile storage unit of claim 8 further comprising releasable access panels operable to cover the first and second compartments.

10. The mobile storage unit of claim 9 wherein the second compartment of the storage portion further comprises a plurality of articulable chambers, and the access panel covering the second compartment is capable of deploying to present the articulable chambers to a user.

11. The mobile storage unit of claim 8 further comprising a release mechanism disposed on the handle member capable of selectively locking the stroller mechanism in a deployed configuration outside of the first compartment.

12. The mobile storage unit of claim 11 wherein the release mechanism is capable of selectively locking both a pivot motion of the yoke member, the rear legs, and the handle member, as well as a telescoping motion of the yoke member and the rear legs.

13. A deployable child carrier comprising:
a handle member;
a telescoping yoke member having at least one wheel attached thereto;
a telescoping rear member having at least one wheel attached thereto;
a pair of opposing central hub members, wherein each of the handle member, the yoke member, and the rear member are pivotally attached to both opposing hub members;
a seating portion disposed about the yoke member;
a release mechanism actuated at the handle member operable to selectively allow rotation of the handle member, the yoke member, and the rear member to a substantially parallel alignment, the release mechanism further being operable to selectively allow collapsing of the telescoping yoke member and the telescoping rear member; and
a storage portion defining an internal compartment capable of housing the handle member, the yoke member, and the rear member when substantially aligned in a stowed configuration.

14. The child carrier of claim 13 wherein the release mechanism releases each of the rear member, the yoke member, and the handle member at approximately the same time upon actuation.

15. The child carrier of claim 13, wherein the storage portion further defines a plurality of internal compartments and the handle member, the yoke member, and the rear member are all capable of being housed within a first internal compartment.

16. The child carrier of claim 15, wherein the storage portion further defines a second internal compartment configured to house user objects while the handle member, the yoke member, and the rear member are housed within the first internal compartment in the stowed configuration.

17. The child carrier of claim 16, wherein the second internal compartment of the storage portion further comprises a plurality of articulable chambers, and an access panel covering the second internal compartment is capable of deploying to present the articulable chambers to a user.

18. The child carrier of claim 13 further comprising a sheet cover deployably housed within a lower compartment of the storage portion and operable to substantially cover the child carrier in the stowed configuration.

* * * * *